US008990698B2

(12) United States Patent
Kazan et al.

(10) Patent No.: US 8,990,698 B2
(45) Date of Patent: Mar. 24, 2015

(54) SOCIAL NETWORK SERVICE SYNCHRONIZATION

(75) Inventors: Wissam S. Kazan, Redmond, WA (US); Felipe Luis Naranjo, Seattle, WA (US); Shazaan T. Bahrainwala, Seattle, WA (US); Mona Akmal, Kirkland, WA (US); Francislav P. Penov, Kirkland, WA (US); Patrick R. Jakubowski, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 652 days.

(21) Appl. No.: 12/565,618

(22) Filed: Sep. 23, 2009

(65) Prior Publication Data

US 2011/0072354 A1  Mar. 24, 2011

(51) Int. Cl.
G06F 3/00 (2006.01)
G06F 9/00 (2006.01)
G06F 17/00 (2006.01)
G06Q 10/10 (2012.01)

(52) U.S. Cl.
CPC .................................. G06Q 10/10 (2013.01)
USPC ............................ 715/738; 715/758; 715/751

(58) Field of Classification Search
CPC ....... G06F 9/4443; G06F 8/34; G06F 3/0481; G06F 3/0482; G06F 8/38; G06F 3/04847; G06F 17/30873; G06F 3/0486; H04N 1/00389; H04N 1/00411; H04L 29/0809; G06Q 10/10
USPC ......... 715/762, 763, 765, 750, 751, 752, 753, 715/758, 759, 780, 789, 864, 865, 738
See application file for complete search history.

(56) References Cited

U.S. PATENT DOCUMENTS

| 2006/0085259 | A1* | 4/2006 | Nicholas et al. ................. 705/14 |
| 2007/0282887 | A1* | 12/2007 | Fischer et al. ................. 707/102 |
| 2008/0134040 | A1 | 6/2008 | Pennington et al. |
| 2008/0222295 | A1 | 9/2008 | Robinson et al. |
| 2008/0288582 | A1* | 11/2008 | Pousti et al. .................. 709/203 |
| 2008/0306918 | A1* | 12/2008 | Mons et al. ....................... 707/3 |
| 2009/0019078 | A1* | 1/2009 | Chisholm et al. ............. 707/102 |
| 2009/0055369 | A1 | 2/2009 | Phillips et al. |
| 2009/0070684 | A1* | 3/2009 | Aldrich et al. ................ 715/743 |
| 2009/0106099 | A1 | 4/2009 | Chow et al. |
| 2009/0216806 | A1* | 8/2009 | Feuerstein et al. ......... 707/104.1 |

(Continued)

OTHER PUBLICATIONS

Mann. B, "Social Graph Applications: Why Not for Every Community Website?", <<http://bmannconsulting.com/blog/bmann/social-graph-applications-why-not-every-community-website>> Apr. 6, 2008, pp. 5.

(Continued)

Primary Examiner — Kieu Vu
Assistant Examiner — Anita D Chaudhuri
(74) Attorney, Agent, or Firm — Bryan Webster; Kate Drakos; Micky Minhas

(57) ABSTRACT

Social network service synchronization techniques are described. In an implementation, a determination is made by a client that a browser has been used to navigate to a website. A prompt is displayed by the client, responsive to the determination, that is selectable to cause data that describes activities that are performable in conjunction with the website to be communicated to a social network service to be stored in conjunction with a user account of the user at the social network service.

20 Claims, 4 Drawing Sheets

(56) References Cited

U.S. PATENT DOCUMENTS

2009/0222925 A1* 9/2009 Hilaiel et al. .................. 726/25
2009/0292814 A1* 11/2009 Ting et al. ..................... 709/229
2009/0313244 A1* 12/2009 Sokolenko et al. ............ 707/5

OTHER PUBLICATIONS

"The Null Device", <<http://dev.null.org/blog/tags/social%20networking>> Aug. 20, 2007, pp. 5.

Logan, Angus, "My Pixels Aren't Free Ad Space for Your Network—'Connecting' Needs Targeting", http://blogs.msdn.com/angus_logan/archive/2009/07/08/my-pixels-aren-t-free-ad-space-for-your-network-connecting-needs-targeting.aspx>>, Jul. 8, 2009, pp. 9.

"Jibbio Connect", <<http://jee.jibbio.com/page/social-network.html>>, Jul. 9, 2009, pp. 2.

Neill, Nick O', "Yahoo! Launches Facebook Connect Competitor", <<http://www.socialtimes.com/2008/10/yahoo-launches-facebook-connect-competitor/>>, Oct. 28, 2008, pp. 9.

Bojars, et al. "Social Network and Data Portability using Semantic Web Technologies", <<http://ftp.informatik.rwth-aachen.de/Publications/CEUR-WS/Vol-333/saw1.pdf>>, In Proceedings of BIS (Workshops), 2008, pp. 5-19.

* cited by examiner

SOCIAL NETWORK SERVICE SYNCHRONIZATION

BACKGROUND

The popularity of social network services is ever increasing. For example, users may leverage a social network service to find and interact with other users, such as friends, business contacts, and so on. This interaction may be performed in a variety of ways, such as through messaging, photo sharing, posting videos, and so on.

However, the ever increasing popularity of the social network services has also resulted in an ever increasing number and variety of social network services. Consequently, it has become more and more difficult for the users to locate and interact with each other across these different social network services, which may be frustrating to the users and foil the social interaction supported by the social network services.

SUMMARY

Social network service synchronization techniques are described. In an implementation, a determination is made by a client that a browser has been used to navigate to a website. A prompt is displayed by the client, responsive to the determination, that is selectable to cause data that describes activities that are performable in conjunction with the website to be communicated to a social network service to be stored in conjunction with a user account of the user at the social network service.

In an implementation, one or more servers of a social network service receive an indication from a client to synchronize data that describes activities at a social network service with data that describes activities at another social network service. The indication is received in response to selection of a prompt output at the client and the prompt is output responsive to a display by the client of a particular webpage of the other social network service. The data is synchronized that describes the activities at the social network service with the data that describes the activities of the other social network service.

In an implementation, one or more computer-readable media comprise instructions that are executable by a client device to monitor navigation to a website that is performed using a browser. If the website is included in a list stored at the client device and the client device is logged into the website, a prompt is output that is selectable to cause data that describes activities performed in conjunction with the website to be imported into a social network service for inclusion in a social updates feed. If the prompt is selected, a communication is formed to be communicated to the social network service to cause the social network service to import the data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

With the boom of social network services, users may have multiple accounts in different social network services. Additionally, activities that are supported by the different social network services may vary. Consequently, it may become difficult for the user to maintain activities across the different services and to share these activities with other users. This may impact the amount of functionality that the user is willing to utilize as the user is confronted with the task of interacting with each of these services which may even cause the user to forgo use of the services out of frustration.

Social network service synchronization techniques are described. In an implementation, the techniques are usable to detect if a user is a part of a social network service and to inform the user if the activities of another service may be added to the social network service. For example, the user may login to a social network service to provide a status update. The user may then browse the Internet using a browser to navigate between one or more other websites.

If the user navigates to a website that supports synchronization with the social network service, a prompt may be output to offer the user an option to synchronize activities of the website with the social network service. In this way, the activities of the user that are performed in relation to a variety of different services may be synchronized across those services automatically and without further user intervention. A variety of other synchronization techniques are also contemplated, further discussion of which may be found in relation to the following sections.

In the following discussion, an example environment is first described that is operable to utilize social network service synchronization techniques. Example procedures are then described which may be employed in the example environment, as well as other environments. Therefore, the example environment is not limited to performing the example procedures and the example procedures are not limited to being performed in the example environment.

Example Environment

Figure 1:
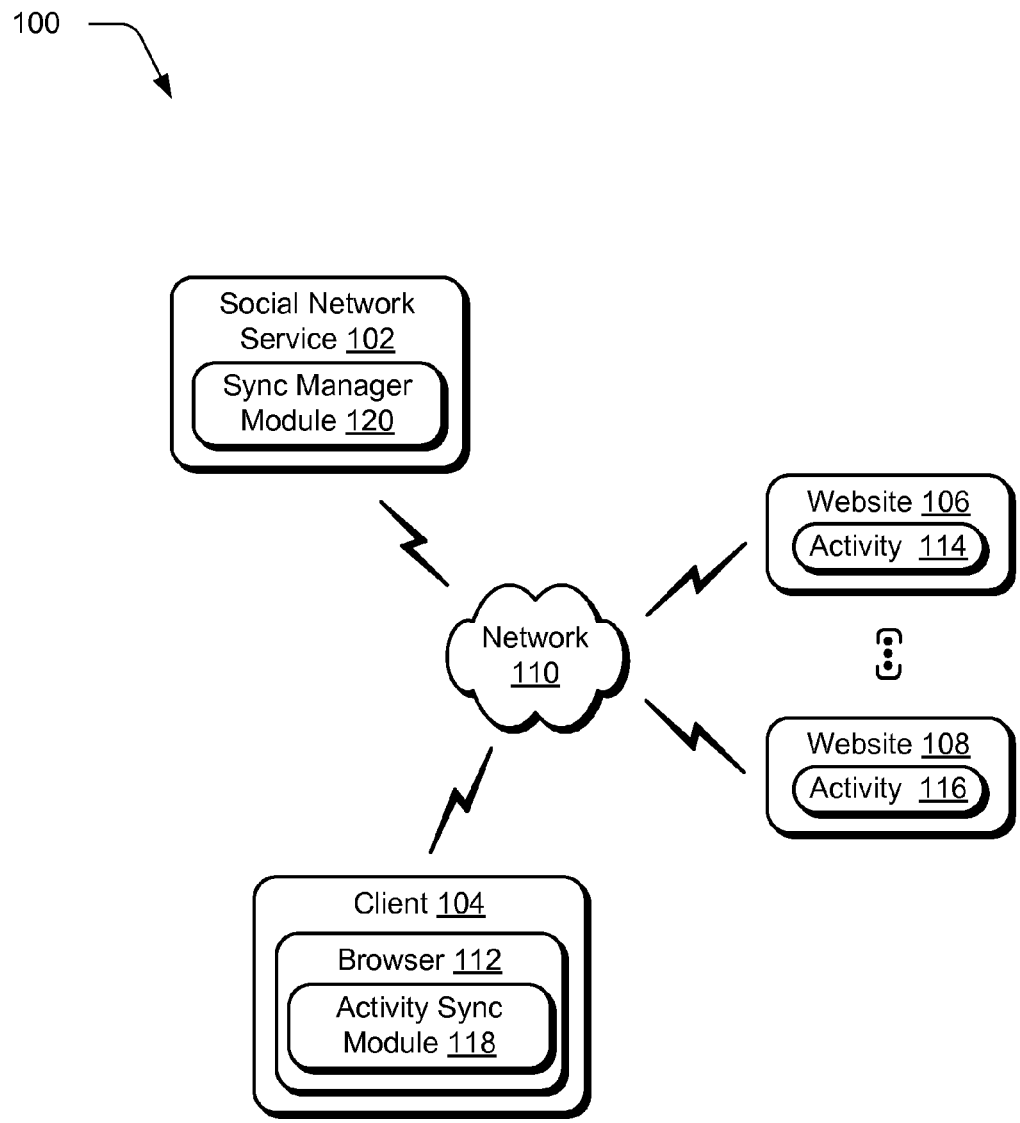
FIG. 1 is an illustration of an environment in an example implementation that is operable to employ social network service synchronization techniques.

FIG. 1 is an illustration of an environment 100 in an example implementation that is operable to employ social network service synchronization techniques. The illustrated environment 100 includes a social network service 102, a client 104, and a plurality of websites 106, 108 that are communicatively coupled via a network 110.

The client 104 may be configured in a variety of ways. For example, the client 104 may be configured as a computing device that is capable of communicating over the network 110, such as a desktop computer, a mobile station, a set-top box communicatively coupled to a display device, a wireless phone, a game console, a netbook, and so forth. Thus, the client 104 may range from full resource devices with substantial memory and processor resources (e.g., personal computers, game consoles) to a low-resource device with limited memory and/or processing resources (e.g., traditional set-top boxes, hand-held game consoles). The client 104 may also relate to an entity that operates the clients, e.g., causes hardware of the client 104 to perform a function. In other words, the client 104 may describe a logical client that includes software and/or devices.

Although the network 110 is illustrated as the Internet, the network may assume a wide variety of configurations. For example, the network 110 may include a wide area network (WAN), a local area network (LAN), a wireless network, a public telephone network, an intranet, and so on. Further, although a single network 110 is shown, the network 110 may be configured to include multiple networks. For instance, social network service 102 and the website 106, 108 may be communicatively coupled via a wired network to communicate, one to another, via the Internet. Additionally, the client 104 may be communicatively coupled to the social network service 102 and the website 106 using a wireless network. A wide variety of other instances are also contemplated.

The client 104 is further illustrated as including a browser 112. The browser 112 is representative of functionality of the client 104 to navigate to different network addresses of the Internet. For example, the browser 112 may be used to navigate to the social network service 102 via the network 110. Once "at" the social network service 102, the browser 112 may be utilized to support a variety of different activities, such as to provide a status update, upload content (e.g., photos, music, video, and so on), set events in a calendar, communicate with another user of the social network service 102, and so on.

Likewise, the browser 112 may be utilized to interact with a variety of activities 114, 116 of respective websites 106, 108. For example, website 106 may also be configured as a social network service and website 108 may be configured as a photo sharing service. Therefore, the browser 112 may be used to interact with social network service activities with the website 106, such as to send and receive messages, comment on photos, watch videos, and so on. The browser 112 may also be used to interact with activities of the website 108 that involve photo sharing, such as to form albums, upload photos, make prints, and so on. Thus, each of the websites 106, 108 may be configured in a variety of ways to provide a variety of activities. Consequently, a user of a conventional client using a conventional browser may find it difficult to synchronize activities between these different locations.

The browser 112 is further illustrated as including an activity sync module 118. The activity sync module 118 is representative of functionality of the client 104 to synchronize activities with the social network service 102. For example, the activity sync module 118 may be executable to monitor the websites to which the client 104 has navigated over the network 110, e.g., website 106, 108. If the website supports the synchronization functionality (e.g., website 106), the activity sync module 118 may provide a prompt to synchronize the activity (e.g., activity 114) with the social network service 102. Although the activity sync module 118 is illustrated as a part of the browser 112, this functionality may be implemented in a variety of ways, such as part of an operating system of the client 104, over a network 110 via a third-party website, and so on.

In response to selection of the prompt, the activity sync module 118 may provide an indication to the social network service 102 to synchronize with the activities 114 through execution of the sync manager module 120. Upon receipt of the indication, for instance, the sync manager module 120 may obtain data that describes the activities 114, 116 of the websites 106, 108 and aggregate this data with data that describes activities performed in conjunction with the social network service 102. Continuing with the previous example, status updates and other activities performed in conjunction with website 106 and photos uploaded to website 108 may be collected by the sync manager module 120 for inclusion with activities performed at the social network service 102. These activities may be included as part of a social updates feed output by the social network service 102, collected in photo albums, and so on. The activities may also be published for receipt by "friends" of the user for inclusion in their respective social updates feed, further discussion of which may be found in relation to FIG. 5.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the synchronization techniques described below are platform-independent, meaning that the techniques may be implemented on a variety of commercial computing platforms having a variety of processors.

Figure 2:
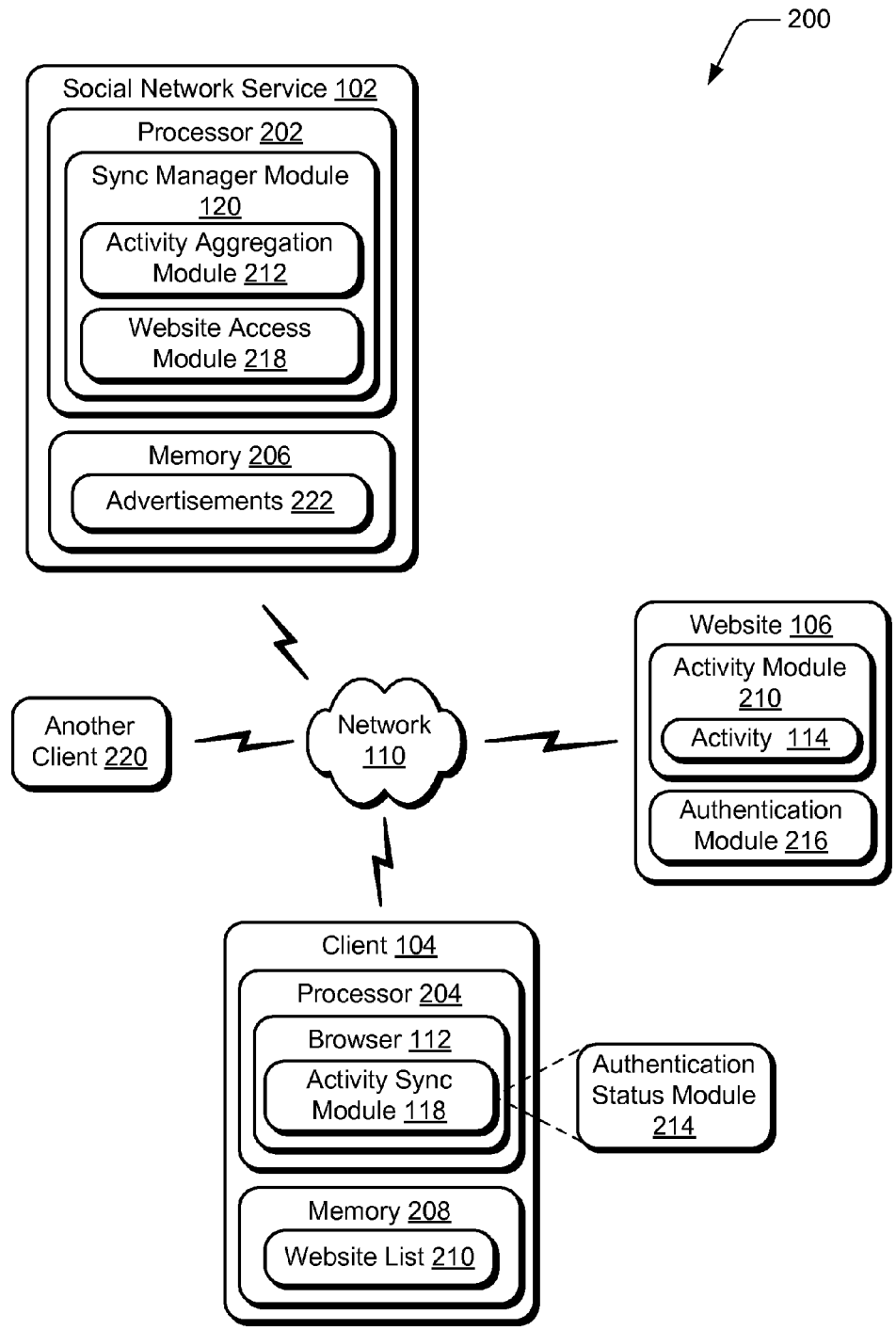
FIG. 2 is an illustration of a system in an example implementation showing the social network service of FIG. 1 as being implemented by one or more servers and the client of FIG. 1 as being implemented as a client device.

FIG. 2 is an illustration of a system 200 in an example implementation showing the social network service 102 as being implemented by one or more servers and the client 104 as being implemented as a client device. Thus, the social network service 102 and the client 104 are illustrated as having respective processors 202, 204 and memory 206, 208.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 206, 208 is shown, respectively, for the server of the social network service 102 and the client 104 device, a wide variety of types and combinations of memory may be employed, such as random access memory (RAM), hard disk memory, removable medium memory, and other types of computer-readable storage media.

The browser 112 and the activity sync module 118 are illustrated as modules formed using instructions that are executable on the processor 204 and storable in the memory 208 of the client 104. The client 104 is also illustrated as maintaining a website list 210 in memory 208 that is usable in conjunction with the activity sync module 118 to determine which websites support synchronization functionality.

For example, the browser 112 may be executed to navigate to the website 106 over the network 110. The activity sync module 118 is configured in this example to monitor which websites are accessed by the browser 112 and compare the websites to website list 210. For instance, the browser 112 may be executed to access the activity 114 provided by the activity module 210 of the website 106. If the website 106 is included in the website list 210, the activity sync module 118 causes the prompt to be output using a display device of the client 104. Thus, the prompt is not output in this example unless the website 106 is included in the website list 210.

As previously described, selection of the prompt may be used to configure the sync manager module 120 to synchronize the activity 114 with the social network service 102. For instance, the sync manager module 120 is illustrated as including an activity aggregation module 212. The activity aggregation module 212 is represented in FIG. 2 as instructions that are executable on the processor 202 and storable in memory 206 to aggregate data that describes the activity 114 of the website 106 with activities of the social network service 102.

Thus, the activity aggregation module 212 in this example may receive an indication from the client 102 to synchronize with the activity 114 of the website 106, e.g., to obtain data that describes the activity 114. The data may be obtained in a variety of ways, such as directly between the website 106 and the social network service 102 (e.g., without involving the client 104), indirectly (e.g., by using the client 104 as an intermediary to communicate the data), and so on (e.g., by using a third-party site). Although in this example the prompt was output when the user navigated to the website 106, the prompt may also be output when a particular webpage of the website 106 is received.

For example, the website 106 may include a variety of different web pages, such as a root webpage, a profile webpage that is used to interact with a user's profile of a social network service, and so on. Accordingly, the website list 210 may also include identifiers of particular web pages such that the prompt is output in conjunction with the particular webpage and is not output in conjunction with another webpage of the website 106. A variety of other examples are also contemplated, such as to output the prompt when particular functionality of a webpage is utilized, e.g., when a video of a webpage is activated, a song is selected for output, an image is selected for printing, and so on.

In another implementation, the synchronization techniques described herein may take into account whether the activity sync module 118 has access to credentials that permit the client 104 to login to the particular website 106. As illustrated, the activity sync module 118 includes an authentication status module 214 that is representative of functionality to determine an authentication status of the client 104. For instance, the browser 112 may navigate to the website 106 over the network 110 as described in the previous example. In this instance, however, the authentication status module 214 determines whether the client 104 has been authenticated, such as by determining whether credentials such as the user name and password have been accepted by an authentication module 216 of the website 106. If so, the authentication status module 214 may permit output of the previously described prompt.

Selection of the prompt in this implementation causes the indication to be communicated from the client 104 to the social network service 102 that includes the credentials that are utilized to login to the website 106. For instance, the sync manager module 120 may include a website access module 218 that is representative of functionality to gain access to websites 106 that include authentication. The website access module 218 may store the credentials received from the client 104 in memory 206 for use in accessing the website 106 automatically and without further user intervention, such as by asking a user of the client 104 to reenter the credentials at a later time. Thus, in this example the prompt is output when the website 106 is included in the website list 210 and sufficient credentials have been received to login the client 104 to the website 106. A variety of other examples are also contemplated, such as when credentials have been received but the website 106 is not included in the website list 210.

The activities may be aggregated by the sync manager module 120 in a variety of ways. For example, the activities may be arranged by type, such as to sync photos in respective albums, status updates in respective feeds, and so on. The activities may also be arranged by source, such as through the use of different tabs or sections to indicate a source of the activity, e.g., each website 106, 108 may have its own tab in a user interface. A variety of other examples are also contemplated, further discussion of which may be found in relation to the following procedures.

Example Procedures

The following discussion describes synchronization techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
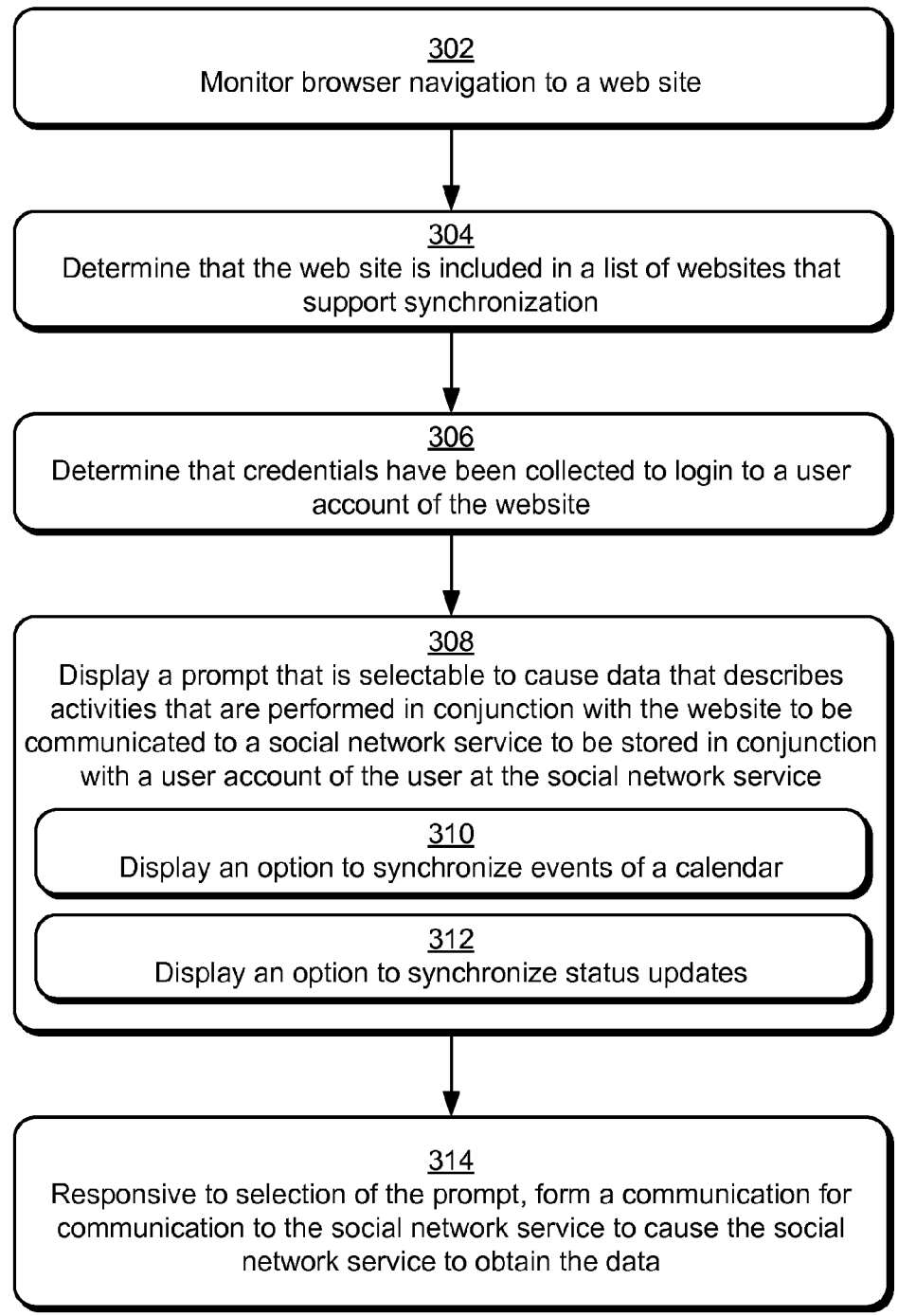
FIG. 3 is a flow diagram depicting a procedure in an example implementation in which a prompt is output to synchronize activities.

FIG. 3 depicts a procedure 300 in an example implementation that is performed by a client in which a prompt is output to synchronize activities. Browser navigation to a website is monitored (block 302). For example, the browser 112 may be directed to browse to a website 106 via network 110 and the activity sync module 118 may be executed to monitor this browsing.

A determination is made that the website is included in a list of websites that support synchronization (block 304). Continuing with the previous example, the activity sync module 118 may determine that an address of the website 106 is included in the website list 210 that describes which websites support synchronization functionality.

A determination is then made that credentials have been collected to login to a user account of the website (block 306). The authentication status module 214, for instance, of the activity sync module 118 may monitor whether credentials have been provided via the browser 112 to login to the website 106. If so, the authentication status module 214 may store the credentials in memory 208. In an implementation, this determination is made after input is received that indicates that a user has selected a portion of a user interface (e.g., an icon, bookmark, text that states "add activities to social network service," etc.) to initiate a process to synchronize activities. Thus, in this implementation the determination of block 304 is not performed. A variety of other implementations are also contemplated.

The prompt is displayed that is selectable to cause data that describes activities that are performed in conjunction with a website to be communicated to a social network service to be stored in conjunction with a user account of the user at the social network service (block 308). As previously described, the prompt may be displayed in a variety of ways, such as part of a pop-up menu, a "toast" notification, an option on a toolbar, and so on. The prompt may also be configured to display an option to synchronize events on a calendar (block 310) and/or synchronize status updates (block 312). Thus, in this way the prompt may be configured to specify specific activities that are to be synchronized.

Responsive to selection of the prompt, a communication is formed for communication to social network service to cause the social network service to obtain the data (block 314). Selection of the prompt, for instance, may cause a communication to be formed that includes the credentials from block 306 and identification of the website from block 304. In this way, the sync manager module 120 of the social network service 102 may obtain data that describes activities performed by the website 106 automatically and without further user interaction, further discussion of which may be found in relation to the following procedure.

Figure 4:
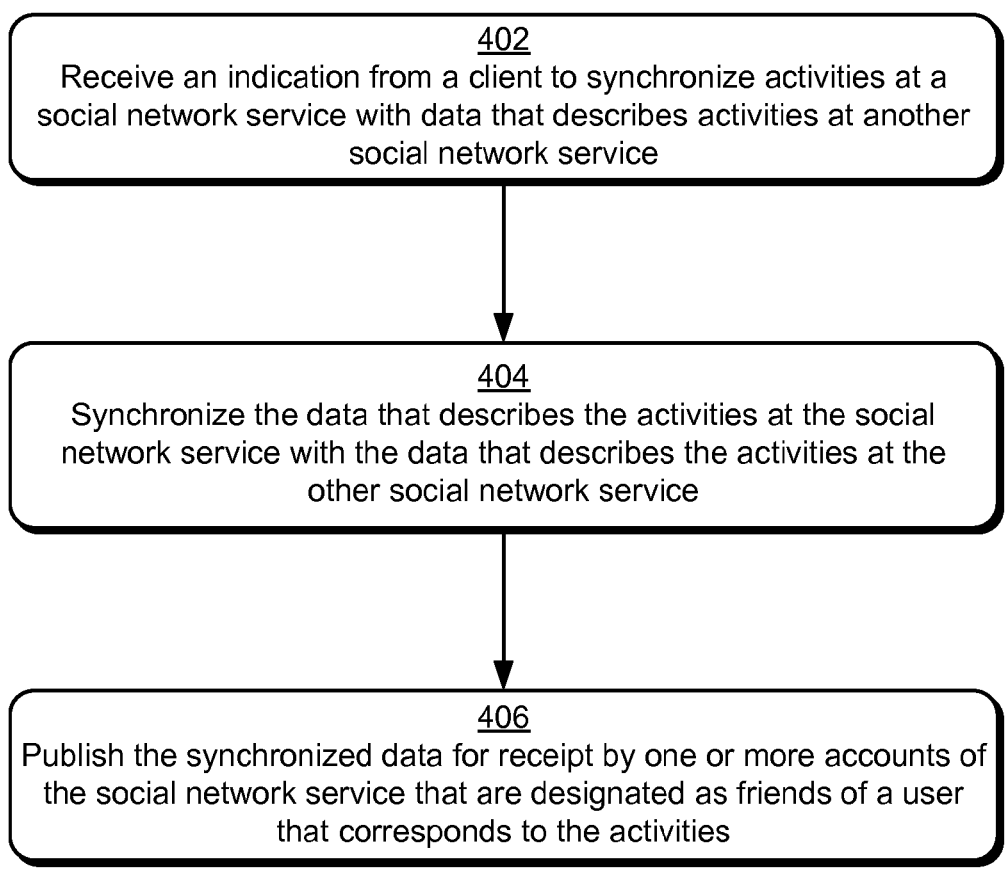
FIG. 4 is a flow diagram depicting a procedure in an example implementation in which a social network service obtains data to synchronize activities with another website.

FIG. 4 depicts a procedure 400 in an example implementation in which a social network service obtains data to synchronize activities with another website. An indication is received from a client to synchronize activities at a social network service with data that describes activities at another social network service (block 402). Continuing with the example of FIG. 3, the social network service 102 may receive the communication from the client 104 via the network 110 that indicates which website 106 is to be used to obtain the data as well as credentials to be used to access the website 106. In the procedure 400 of FIG. 4, the website 106 is configured as a social network service although other configurations are also contemplated.

Data is synchronized that describes the activities at the social network service with the data that describes the activities at the other social network service (block 404). For example, the sync manager module 120 may employ functionality represented by the website access module 218 to access the website 106 over the network 110, such as to provide credentials to access a user's account. The sync manager module 120 may then import data that describes one or more of the activities 114 of the website 106.

For instance, the data may describe a social network feed (e.g., status updates, photos and so on) that would be output in conjunction with a user's account of the website 106. This data may be aggregated with data from the social network feed of the social network service 102 to provide an aggregated feed. A variety of other examples are also contemplated, such as to export data by the social network service 102 that describes activities that were performed in conjunction with the service such that the website 106 may also provide an aggregated social network feed, to synchronize calendars, and so on.

The synchronized data that corresponds to the activities may also be published for receipt by one or more accounts of the social network service that are designed as friends of a user (block 406). Continuing with the previous example, the social network feed may be used to display status updates of other users. As such, the data obtained from the website 106 that is aggregated with the data of the social network service 102 may be published for display in the social network feeds of friends of the user. Thus, the friends may be "kept up to date" regarding the activities of the other social network service (e.g., website 106) or other website, such as a photo sharing service. A variety of other examples are also contemplated, such as to configure the website 106 as a calendaring service and so on. For example, other activities are also contemplated that do not involve interaction with "friends," such as to keep a calendar up-to-date.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method performed by a client, the method comprising:
   determining by the client that a browser has been used to navigate to a synchronization website at a first time and at a second time that is after the first time;
   responsive to a determination that the synchronization website is included in a list stored at the client and the client is logged into the synchronization website, outputting a prompt during display of the synchronization website at the first time and at a second time that is selectable to cause data that describes activities performed in conjunction with synchronization website to be imported into a social network service for inclusion in a social update feed, in which;
      said prompt that is output at the first time enabling data that describes the activities associated with the first time to be imported into the social network service and indicating that the synchronization website supports synchronization with the social network service of the activities associated with the first time; and
      said prompt that is output at the second time enabling data that describes the activities associated with the second time to be imported into the social network service and indicating that the synchronization website supports synchronization with the social network service of the activities associated with the second time; and
   responsive to selection of the prompt, forming a communication to be communicated to the social network service to cause the social network service to import the data corresponding to the selected prompt.

2. A method as described in claim 1, wherein:
   the determining is performed responsive to navigation to the synchronization website, that is different from a website corresponding to the social network service, using the browser; and
   the outputting of the prompt is performed in conjunction with the client being logged into the synchronization website using the credentials.

3. A method as described in claim 2, wherein a webpage of the synchronization website is displayed in conjunction with the prompt and the outputting of the prompt is performed responsive to the display of the webpage and not another webpage of the synchronization website.

4. A method as described in claim 1, wherein the determining is performed responsive to determining that the synchronization website is included in the list stored at the client, the list listing websites that support synchronization.

5. A method as described in claim 1, wherein:
   the outputting of the prompt is performed if a user account of the social network service is also logged into; and
   the synchronization website is part of another social network service.

6. A method as described in claim 5, wherein at least some of the activities associated with the first time and the second time include status updates.

7. A method as described in claim 1, wherein at least some of the activities associated with the first time and the second time involve events in a calendar maintained at the synchronization website and the data that describes the activities describes the events.

8. A method as described in claim 1, wherein the communication that is formed enables the data to be communicated from the synchronization website to the social network service without being communicated through the client.

9. A method as described in claim 1, wherein the data that describes the activities is communicated automatically and without manual reentry of credentials to login to the synchronization website and to the social network service.

10. A method performed by one or more servers of a social network service, the method comprising:

receiving a communication from a client to synchronize data that describes activities at the social network service with data that describes activities at another social network service, the communication received in response to selection of a prompt output at the client, the prompt is output at a first time and at a second time that is after the first time:

responsive to navigation by the client to the other social network service and a determination that the other social network service is included in a list of synchronization websites stored at the client and the client is logged into the other social network service, the prompt is selectable to cause data that describes activities performed in conjunction with the other social network service to be imported into the social network service for inclusion in a social update feed, in which;

said prompt that is output at the first time enabling data that describes the activities associated with the first time to be imported into the social network service and indicating that the other social network service supports synchronization with the social network service of the activities associated with the first time; and said prompt that is output at the second time enabling data that describes the activities associated with the second time to be imported into the social network service and indicating that the other social network service supports synchronization with the social network service of the activities associated with the second time; and synchronizing the data that describes the activities at the social network service with the data that describes the activities of the other social network service that are associated with the first time and the second time.

11. A method as described in claim 10, wherein the prompt is not output at the client when the client displays a webpage from a website that is not included on the list of synchronization websites that is stored at the client.

12. A method as described in claim 10, wherein the prompt is output responsive to navigation by the client to a particular webpage of the other social network service and the particular webpage is configured to interact with a profile for the user at the other social network service.

13. A method as described in claim 12, wherein the prompt is not output when the client displays a different webpage of the other social network service.

14. A method as described in claim 10, further comprising publishing the synchronized data for receipt by one or more accounts of the social network service that are designated as friends of a user that corresponds to the activities.

15. A method as described in claim 10, wherein the activities at the social network service and the activities of the other social network service that are associated with the first time and the second time involve events in respective calendars.

16. A method as described in claim 10, wherein the activities at the social network service and the activities of the other social network service that are associated with the first time and the second time involve status updates.

17. A method as described in claim 10, wherein the synchronizing is automatically performed at periodic intervals of time without manual reentry of credentials by a user.

18. One or more computer-readable storage hardware devices comprising instructions stored thereon that are executable by a client device to perform operations comprising:

monitoring navigation to a website that is performed using a browser at a first time and at a second time that is after the first time, the navigated to website is not part of a particular social network service;

responsive to a determination that the website is included in a list stored at the client device and the client device is logged into the website, outputting a prompt during output of the website at the first time and at the second time that is selectable to cause data that describes activities performed in conjunction with the website to be imported into the particular social network service for inclusion in a social updates feed, in which:

said prompt that is output at the first time enabling data that describes the activities associated with the first time to be imported into the particular social network service and indicating that the web site supports synchronization with the social network service of the activities associated with the first time; and said prompt that is output at the second time enabling data that describes the activities associated with the second time to be imported into the particular social network service and indicating that the website supports synchronization with the social network service of the activities associated with the second time; and responsive to selection the prompt, forming a communication to be communicated to the particular social network service to cause the particular social network service to import the data corresponding to the selected prompt.

19. One or more computer-readable storage hardware devices as described in claim 18, wherein the prompt includes an option to specify that the activities that include events of a calendar are to be imported and that the activities that include status updates are not to be imported.

20. One or more computer-readable storage hardware devices as described in claim 18, wherein the prompt causes the particular social network service to export data that describes activities that are performed in conjunction with the particular social network service to the website.

* * * * *